United States Patent [19]

Pyles

[11] 4,239,237
[45] Dec. 16, 1980

[54] TURNTABLE DRIVE SYSTEM FOR VIDEO DISC PLAYER

[75] Inventor: Gerald D. Pyles, Danville, Ind.
[73] Assignee: RCA Corporation, New York, N.Y.
[21] Appl. No.: 42,919
[22] Filed: May 29, 1979
[51] Int. Cl.³ .............................................. A02P 5/46
[52] U.S. Cl. ............................... 274/1 E; 274/39 A; 318/66
[58] Field of Search ........................... 318/41, 66, 67; 310/112, 114, 113, 156, 168; 274/39 A, 1 E

[56] References Cited
U.S. PATENT DOCUMENTS

| | | | |
|---|---|---|---|
| 3,848,146 | 11/1974 | Tourtellot et al. | 310/163 |
| 3,912,283 | 10/1975 | Hammond et al. | 274/39 A |
| 4,100,465 | 7/1978 | Hagino | 274/39 A |

*Primary Examiner*—Steven L. Stephan
*Attorney, Agent, or Firm*—Eugene M. Whitacre; Joseph S. Tripoli; Dilip A. Kulkarni

[57] ABSTRACT

A turntable drive motor comprises a stator having a core defining an airgap for receiving a rotor, and a field winding for establishing an alternating magnetic flux of a given frequency therein. An elastic belt is disposed about a pully mounted on the rotor shaft and a flange secured to the turntable. A ring having a plurality of permanently magnetized poles of alternate polarity along its periphery is attached to the flange. A pair of elements are secured to the core for diverting a portion of the stator magnetic flux to a region adjacent to the ringed magnets. The relationship between the excitation frequency and the number of the permanently magnetized poles is such that deviations in the rate of rotation of the turntable for a desired rotational rate are opposed.

5 Claims, 4 Drawing Figures

TURNTABLE DRIVE SYSTEM FOR VIDEO DISC PLAYER

The present invention generally relates to a video disc player. More particularly, this invention relates to a turntable speed control system for a video disc player.

Numerous information recording and playback systems require a turntable to be rotated at a precise speed for proper operation. For example, such a requirement exists in a video disc system. In certain video disc systems, video information is recorded by means of geometric variations in the bottom of a smooth spiral groove on the surface of a disc record. The record surface may include a coating of conductive material which is preferably covered with a thin deposit of dielectric material. A pickup stylus engages the spiral groove and includes a conductive surface which, together with the conductive coatings and dielectric deposit on the record, forms a capacitor. When the record is rotated, an edge of the conductive surface of the pickup stylus, while riding in the groove, recovers capacitive variations due to the geometric variations therein. The capacitive variations, indicative of prerecorded video information, are applied to a suitable signal processing circuit and electrical signals obtained therefrom are then coupled to a conventional television receiver for reproduction. One such variable capacitor concept, as applied to video disc systems, is described in detail in the U.S. Pat. No. 3,842,194, issued on Oct. 15, 1974 to Jon K. Clemens. In video disc systems, such as the Clemens type, it has been recognized that, not only the average speed of relative motion between the recorded and the pickup stylus must be maintained at a predetermined speed (e.g., 7.5 rps) but the speed variation about the average speed must be maintained within specified tolerance limits (e.g., ±0.01 percent) to obtain accurate reproduction of the prerecorded signals. The predetermined speed and the specified tolerance limits are also necessary to assure that the horizontal and vertical synchronizing information is stable and within the lockup range of the deflection circuits of the television receiver. Moreover, when the prerecorded information is a color television signal, with chrominance information recorded as a modulated carrier signal, the recovered signal must be stable and within the lockup range of the color processing circuits of the playback system in order to minimize phase distortion.

In U.S. Pat. No. 3,912,283, issued on October 14, 1975 to Robert J. Hammond, et al., a turntable speed control system is disclosed which permits highly accurate maintenance of a turntable's rotational speed at a desired speed, despite load variations, parts wear, line voltage variations, etc. In the therein disclosed system, a motor-driven turntable supports, for rotation therewith, an even-number plurality of permanent magents (e.g., 16) symmetrically disposed along the periphery of a ring, concentric with the center of rotation of the turntable, with alternating polarity (i.e., with every other magnet poled to present a north pole and with the intervening magnets oppositely poled). A fixedly mounted core of magnetizable material includes a pair of pole pieces having spaced surfaces which form an air gap, across which magnetic flux is directed when a winding on the core is energized with alternating current (e.g., 60 cps.). The core gap is positioned to receive the ring so that the permanent magnets pass in succession through the air gap when the turntable is rotating. The rotating magnet ring and the energized core form a synchronizer which opposes any departures of the turntable speed from a rotational frequency (e.g., 7.5 rps) corresponding to the frequency of the winding energization current (e.g., 60 cps) divided by half the number of the ringed magents (e.g., 8). The coupling between the drive motor (e.g., a synchronous motor) and the turntable is desirably such as to permit, when necessary an asynchronous relationship between the respective rates of rotation. Illustratively, this characteristic is provided by utilizing a non-slip belt drive for transmitting motion from a motor shaft supported pulley to the turntable with the drive belt formed of a yieldable material permitting belt deformation to accommodate asynchronous rotational conditions. The yieldable belt drive may, for example, be of the type described in U.S. Pat. No. 3,873,365, issued on Mar. 25, 1975 to James C. Schopp, et al.

The above-described system maintains a precise relationship between the turntable rotation frequency and the winding energization current frequency with a high degree of accuracy. However, if such relationship maintenance is to result in maintenance of the absolute value of the turntable rotational frequency at a desired frequency value with a high degree of accuracy, it is essential that the source of winding energization current have a high degree of frequency stability.

In video disc playback systems (for example, of the type disclosed in the U.S. Pat. No. 3,842,194), it is typically desired that the turntable rotational frequency be held within ±0.01% of a predetermined rotational frequency value (e.g., 7.5 rps). In some areas of the world, the frequency of the house current supplied by the power distribution system (i.e., mains supply) is normally sufficiently stable that such house current may be used to energize the synchronizer winding, with assurance that the synchonizer will maintain the turntable rotational frequency within the indicated ±0.01% deviation limits. However, in other areas of the world, the frequency stability of the power line system is sufficiently poor (e.g., ±0.25%) that the rotational frequency stability desired for video disc playback cannot be assured by the above-described synchronizer approach when house current is employed for core winding energization. U.S. Pat. No. 4,100,465, issued on July 11, 1978 to Hagino describes a system wherein the above-described synchronizer approach may be employed to obtain a high degree of turntable rotational frequency stability (e.g., of the order of ±0.01% or better, as desired for video disc playback operations), with substantial independence of the frequency instabilities that may be associated with the power distribution system in the area where the turntable is operated.

An improved turntable drive system which, without comprising turntable speed accuracy, results in notable savings in cost and power consumption is herein described. The apparatus pursuant to this invention comprises a turntable drive mechanism and a turntable speed control mechanism. The turntable drive mechanism includes a stator having an airgap for receiving a rotor, and a field winding for establishing an alternating magnetic flux of a given frequency. A yieldable coupling means couples the rotor to the turntable. The turntable speed control mechanism includes means for diverting a portion of the stator magnetic flux to a pair of pole pieces and a ring mounted to the turntable in the vicinity of the pole pieces and having a plurality of permanently magnetized poles of alternate polarity along its periphery. The relationship between the given frequency and the number of the permanently mangetized poles is such that deviations in the rate of rotation of the turntable from a desired rotational rate are opposed.

Figure 1:
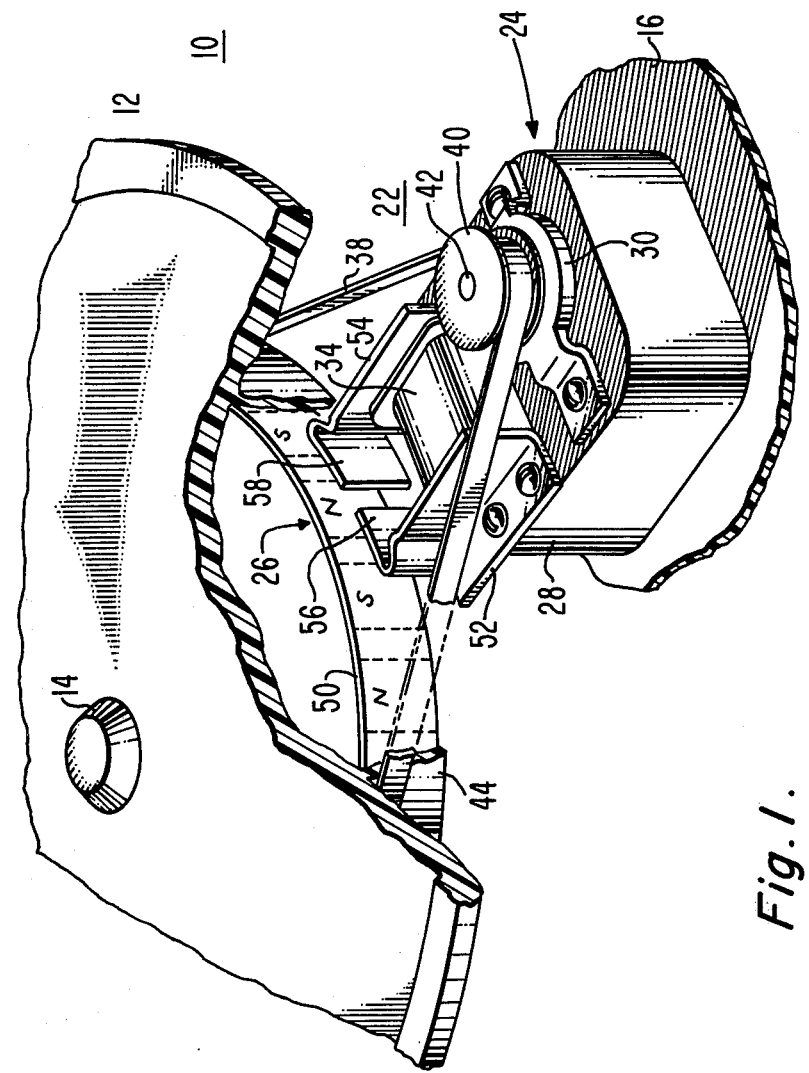
FIG. 1 illustrates a video disc player incorporating a turntable drive system in accordance with the principles of the instant invention.
Figure 2:
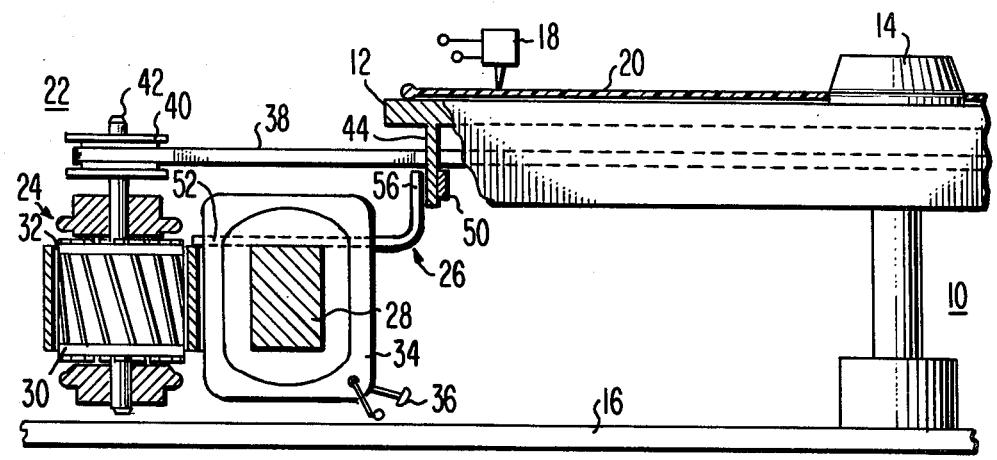
FIG. 2 shows a side view of the turntable drive system of FIG. 1.

Illustrated in FIGS. 1 and 2, is a video disc player 10 of the type described in U.S. Pat. No. 3,842,194 (Clemens). As shown therein, a turntable 12 is rotatably supported by a spindle 14 fixedly secured to a mounting plate 16 of the player housing. A signal pickup 18 recovers recorded information from a record 20 disposed on the turntable as indicated in FIG. 2. The output of the signal pickup, after appropriate processing is applied to a conventional television receiver.

The turntable drive system 22 of the present invention comprises a turntable motor 24 and a speed control mechanism 26. The motor consists of a stator having a core 28 fixedly disposed on the mounting plate 16, and a rotor 30 mounted in an airgap 32 FIG. 2 formed in the stator core. A field winding 34 having terminals 36 is disposed about the core. When power is applied to the terminals (e.g., house current), an alternating magnetic flux of a given frequency (e.g., 60 cps) is established in the stator core. The motor, when energized, drives the turntable by means of a yieldable belt 38 disposed about a grooved pulley 40 mounted on a rotor shaft 42 and a downwardly depending annular flange 44 coaxially secured to the underside of the turntable. The rotational speed of the motor and the dimensions of the pulleys 40 and 44 are selected such that the turntable is nominally caused to rotate at a desired predetermined speed (e.g., 7.5 rps). The motor is, illustratively, of the type described in U.S. Pat. No. 3,848,146 (Tourtellot et al.,). The belt is, for example, fabricated from elastic, creepable material such as neoprene rubber, polyurethane, etc.

Figure 4:
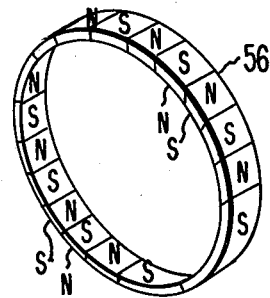
FIG. 4 represents a magnetized ring having an even number plurality of permanent magnets disposed symmetrically along its periphery which is suitable for use in the turntable drive systems of FIGS. 1-3.

The speed control mechanism 26 comprises a magnetic ring 50 affixed to the interior of the downwardly depending flange 44, and a pair of elements 52 and 54 secured to the core 28 and having poles 56 and 58 disposed near the exterior of the downwardly depending flange, as shown in FIGS. 1 and 2. The ring 50 has an even-number plurality of permanently magnetized poles of alternate polarity (e.g., 16) symmetrically disposed along its periphery, as indicated in FIG. 4. The magnetized ring is preferably made from the Plastiform Brand Permanent Magnet material, BX-1013, type 1.4H. The turntable and the downwardly depending flange are preferably made from nonmagnetic material.

The elements 52 and 54 divert a portion of the given frequency magnetic flux established in the core to a region in the vicinity of the ringed magnets. The relationship between the excitation frequency and the number of permanently magnetized pole pairs on the magnetized ring (e.g., 60 cps/8 pole pairs) is such that the deviations in the rate of rotation of the turntable from a desired rotational rate are opposed.

Figure 3:
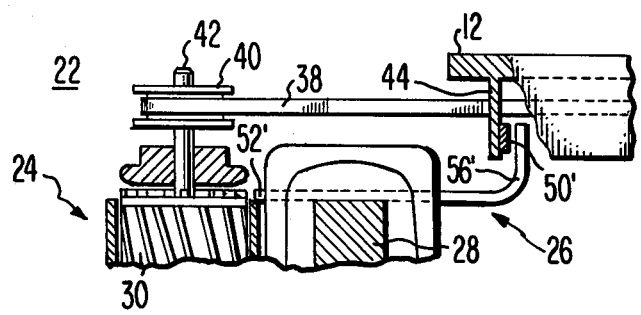
FIG. 3 depicts a side view of another embodiment of the turntable drive system pursuant to the subject invention.

FIG. 3 shows another embodiment of the invention. In the FIG. 3 embodiment, both the ringed magnets 50' and the poles 56' are disposed on the inside of the downwardly depending flange, 44 as shown therein. In this particular embodiment, the downwardly depending flange may be made either from non-magnetic material or magnetic material.

The principle of operation of the turntable drive system is as follows. In a magnetic circuit including a fixed and movable magnetic flux-carrying element, the movable element will tend to assume a position such that the reluctance of the magnetic circuit is at a minimum, and a synchronizing force is exerted on the movable element to try to make it assume the position of minimum reluctance. In the present invention, the variable reluctance across the poles 56 and 58 is at a minimum when the turntable mounted ring member 50 is rotating at the predetermined speed. The predetermined speed (e.g., 7.5 rps) is equal to the frequency of the power supply (e.g., 60 cps) divided by the number of the pole pairs (e.g. 8). It will be noted that the reluctance of the magnetic circuit is at a minimum when the variable portion of the reluctance (i.e., the reluctance across the poles 56 and 58) is at a minimum. If the turntable 12 rotates at a higher speed than the predetermined speed, the synchronizing force will tend to decelerate the turntable and vice versa. Thus, the turntable is locked to rotate at the predetermined speed. Experience indicates that speed accuracy better than ±0.01 percent can be obtained by the turntable drive system of the present invention.

The turntable drive system of the present invention is inexpensive, simple and rugged in construction, amenable to mass production techniques, and yet it is highly accurate (e.g., speed errors less than ±0.01 percent). Thus, the turntable drive system of the present invention obtains results long sought by the information recording and playback industry but which were unobtainable at comparable costs until the present invention.

What is claimed is:

1. A turntable drive system comprising:
   (a) a housing;
   (b) a turntable rotatably mounted in said housing;
   (c) turntable rotating means including a stator and a rotor; said stator consisting of a core defining an airgap for receiving said rotor, and a field winding for establishing an alternating magnetic flux of a given frequency in said core;
   (d) yieldable means for coupling said rotor to said turntable to cause said turntable to rotate;
   (e) turntable speed control means including a pair of pole pieces, means coupled to said core for diverting a portion of said magnetic flux to said pair of pole pieces, and a ring mounted on said turntable adjacent to said pole pieces and having a plurality of permanently magnetized poles of alternate polarity along the periphery thereof; the relationship between said given frequency and the number of said permanently magnetized poles being such that said turntable speed control means oppose deviations in the rate of rotation of said turntable from a desired rate of rotation.

2. A turntable drive system as defined in Claim 1 wherein said yieldable coupling means comprises a pulley secured to said rotor, a flange mounted to said turntable and a belt disposed about said pulley and said flange; said magnetized ring being secured to the interior of said flange.

3. A turntable drive system as defined in claim 2 wherein said flux diverting means includes a pair of elements secured to said turntable rotating means and defining said pair of pole pieces.

4. A turntable drive system as defined in claim 3 wherein the configuration of said pair of elements is such that said pair of pole pieces is disposed on the side of said flange remote from said magnetized ring.

5. A turntable drive system as defined in claim 3 wherein the configuration of said pair of elements is such that said pair of pole pieces is disposed on the same side of said flange as said magnetized ring.

* * * * *